Fig. 2.

Jan. 20, 1970  F. Z. FOUSE  3,490,891
MULTICLUSTER BLOW MOLDING MACHINE
Filed Oct. 3, 1966  9 Sheets-Sheet 4

INVENTOR.
FREDERICK Z. FOUSE
BY
ATTORNEY

INVENTOR.
FREDERICK Z. FOUSE
BY
ATTORNEY

United States Patent Office 3,490,891
Patented Jan. 20, 1970

3,490,891
MULTICLUSTER BLOW MOLDING MACHINE
Frederick Z. Fouse, Lancaster, Ohio, assignor to Anchor Hocking Glass Corporation, Lancaster, Ohio, a corporation of Delaware
Filed Oct. 3, 1966, Ser. No. 583,548
Int. Cl. C03b 9/18
U.S. Cl. 65—224                               5 Claims

ABSTRACT OF THE DISCLOSURE

A method and apparatus for forming hollow seamless glass articles by blow molding. A glass gob is preformed into a patty by one of a plurality of patty forming heads carried by a rotary turret. The patty is then transferred to a paste mold turret which is situated adjacent the patty forming turret and which carries a large number of blow molds arranged in a series of clusters around its periphery. Each cluster rotates about its own axis as the turret is advanced to perform the several blow molding steps on the patties.

---

The present invention relates to glassware manufacture and more particularly to an improved method and apparatus adapted for forming seamless hollow glass articles.

The method and machine of the present invention are especially adapted for the manufacture of thin walled glass articles of relatively large size such as the well known heat resistant coffee maker bowls or chemical ware formed of borosilicate glass although the method and machine are equally adaptable for use with regular flint glass or other glass melts for forming hollow glass articles of a wide range of shapes and sizes.

Hollow glass articles and particularly thin walled glass articles are presently manufactured by a blowing process where the initial charge or gob of glass, at least in its final forming stages is blown to its final shape in molds known as paste molds and where the shaping force is provided by the injection of compressed air under pressure into the molds.

The paste mold process is particularly advantageous in the manufacturing of thin walled articles including heat resistant thin wall articles as it forms the completed glass shape without the usual seams which normally result in the manufacture of glass articles where split molds and forming plungers provide the main shaping forces.

While the paste molding process for glass forming is particularly advantageous for the above reasons, it has not been extensively applied to the manufacture of thin walled glass articles of larger diameters in automatic machinery since the blowing operation consumes an appreciable time interval and since the general type of machine previously used would occupy an impractically large floor space when proportioned for molding the larger diameter articles.

The method and machine of the present invention provide a novel method and apparatus which permits a blowing type of paste mold forming to be used for glass articles of relatively large diameter without requiring the automatic forming machinery to occupy such an impractically large floor space.

The method and machine of the present invention, in fact, provide a paste mold machine of relatively large capacity capable of producing thin wall articles of relatively large diameters at a high rate not heretofore approached by machinery of a correspondingly compact size and general overall reliability and efficiency.

As will be more fully explained and described below, these improved results are obtained by the use of a novel preshaping machine for initially shaping the glass charge and for thereafter automatically feeding it into a turret-type of paste mold machine having a large number of individual paste molds assembled in a series of individual clusters mounted at the periphery of the main support turret.

Accordingly, an object of the present invention is to provide improved method and means of forming glass articles.

Another object of the present invention is to provide an improved method and means for automatically paste molding glass articles.

Another object of the present invention is to provide an improved method and means for forming thin walled glass articles.

Another object of the present invention is to provide an automatic molding machine of high capacity and relatively small size.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification; wherein:

GENERAL DESCRIPTION

As already indicated, the machine of the present invention is preferably a glass forming machine of the type known as a paste mold machine. These machines derive their name from a lubricating material or paste applied to the inside of the molds during the formation of the glass articles. Relative motion is facilitated between the molds and the article by the lubricating paste which in combination with a saturating water spray forms a steam cushion to permit the rotation of the hot glass article in the mold. This molding process is particularly appropriate for thin walled containers as the movement of the molded article in the mold gives a smooth finished article without the usual mold marks which result where split molds are used for forming glass articles without rotation.

The machine will first be described generally with particular reference to FIGS. 1 and 2.

The general description will follow the successive steps of the method beginning with the discharge of a gob of glass from the glass furnace into the machine.

Figure 2:
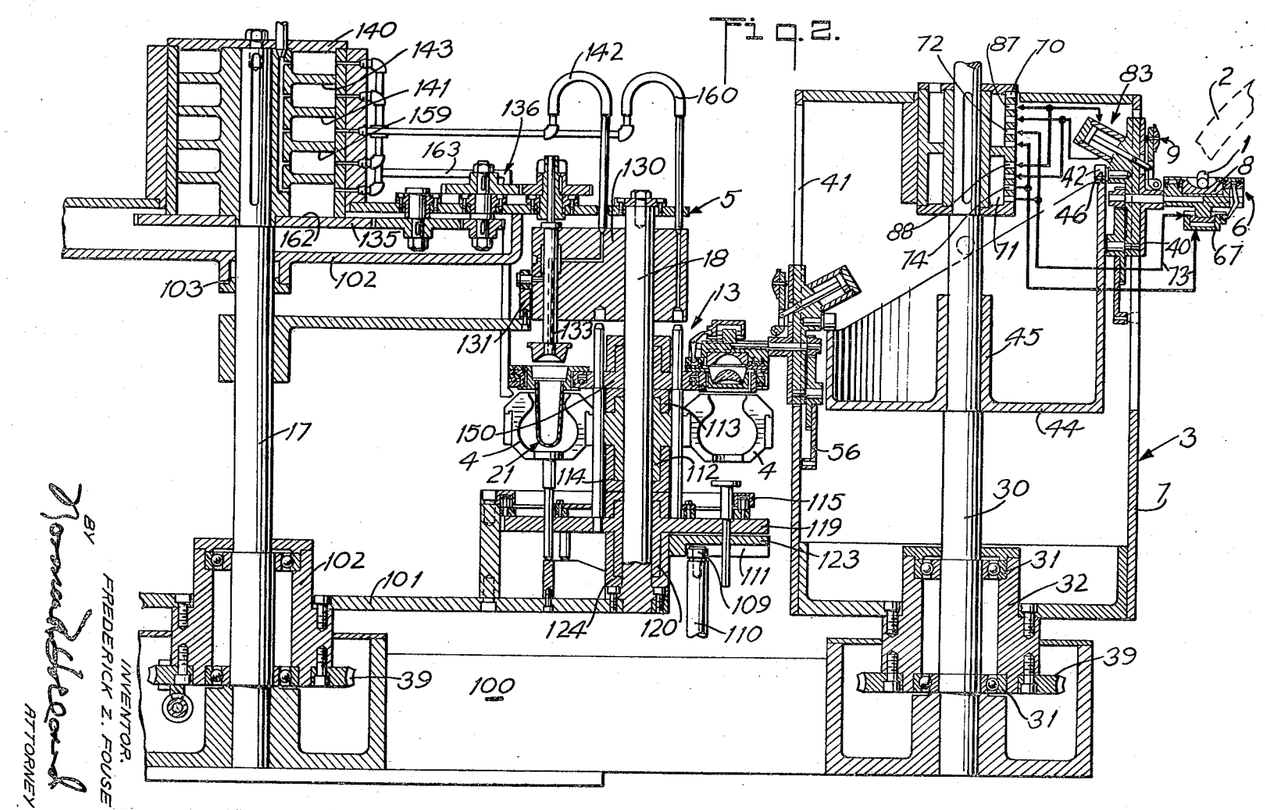
FIG. 2 is a sectional view of the machine of FIG. 1 taken along line 2—2 on FIG. 1.

A gob 1 is illustrated at the right hand side of FIG. 2 dropping from a gob chute 2 of the glass furnace into the patty former 3 which is the first principal section of the machine. The patty former 3 receives this gob 1 and reshapes it into a circular patty as shown in cross-section at 10 in FIG. 7 and which is shaped and proportioned to be thereafter transferred into a mold 4 in the second principal portion of the machine which is the paste mold turret 5.

The patty former 3 has a series of patty forming heads 6 mounted around the periphery of a rotating drum 7. Each of these heads 6, which will be described more fully below, includes a patty forming die 8 and a patty flattener 9 which cooperate to shape each glass gob 1 into tthe patty 10 as the patty forming head 6 is carried by the rotating drum 7 from the gob feed point around to a patty transfer position as illustrated adjacent the patty 10 at the center of FIG. 1.

Figure 7:
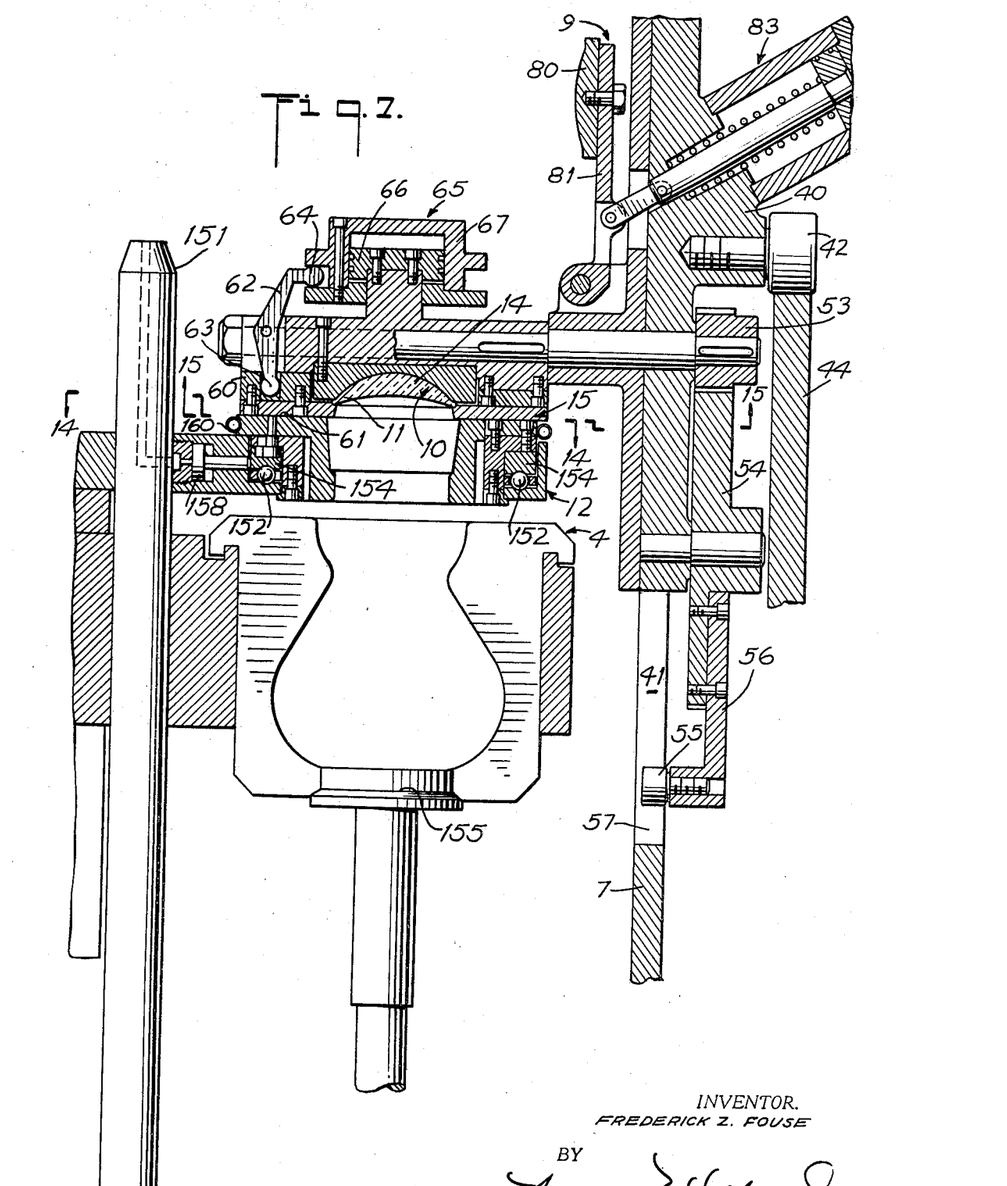
FIG. 7 is a vertical sectional view illustrating a patty forming head and paste mold at the patty transfer position.

The completed patty 10, which was formed by the co-operating action of the patty flattener 9 and the patty forming die 8 is illustrated in FIG. 7 at this transfer position. The patty 10 is seen to include an annular rim or bead portion 11 adapted to fit into a neck ring 12 of the paste mold head 13 and a generally convexly shaped thickened center portion 14 which provides the glass for forming the article side walls in the subsequent blowing operation. At the transfer position, a patty forming neck ring 15 is opened to release the completed patty 10 to drop the patty 10 into the paste mold neck ring 12 above a paste mold 4 mounted on the paste mold turret 5.

As best illustrated in FIG. 2, the paste mold turret 5 is mounted on a central post 17 for rotation about the post 17 and so that a series of blow mold clusters or heads 13 are carried continuously around the center post 17 during a paste mold blowing operation which will be described in further detail below.

Figure 1:
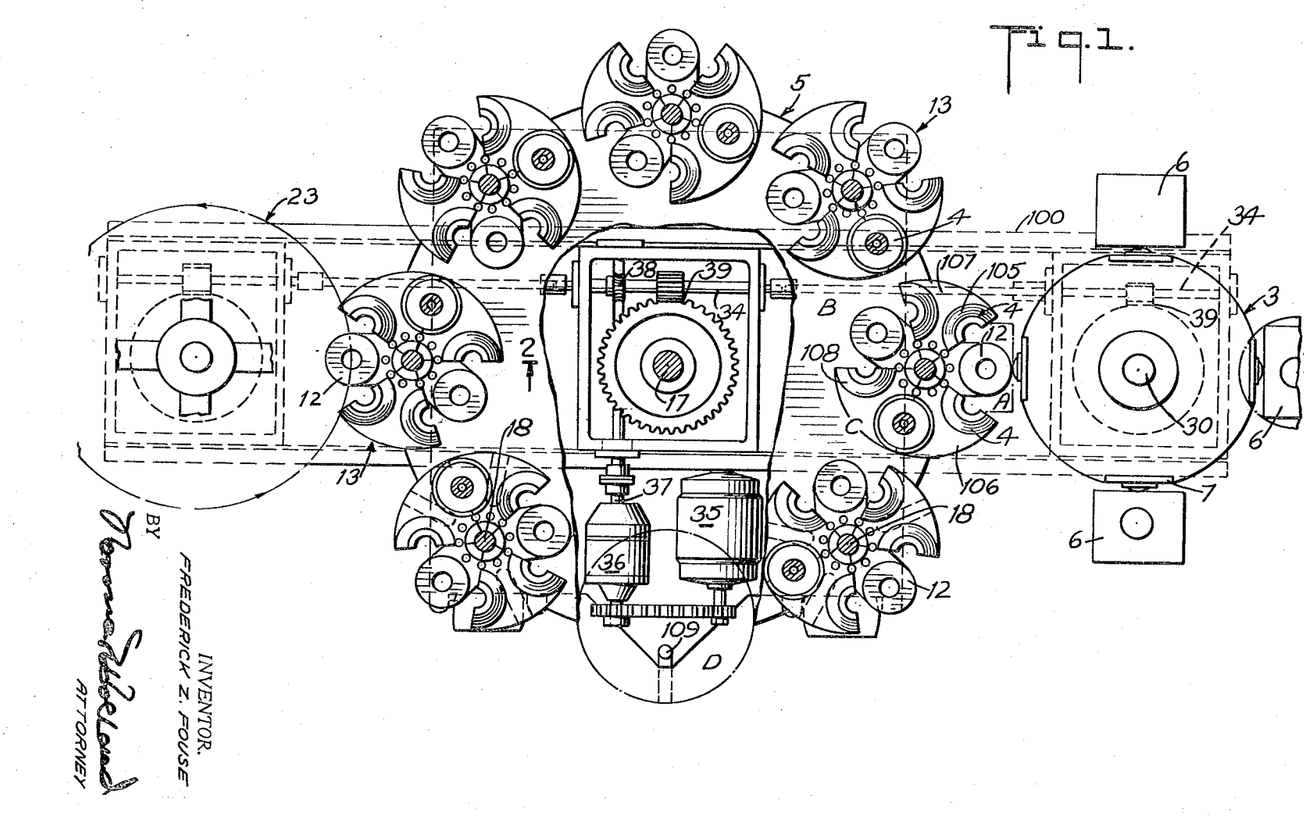
FIG. 1 is a top plan view partially cut away of a glass forming machine in accordance with the present invention.
Figure 3:
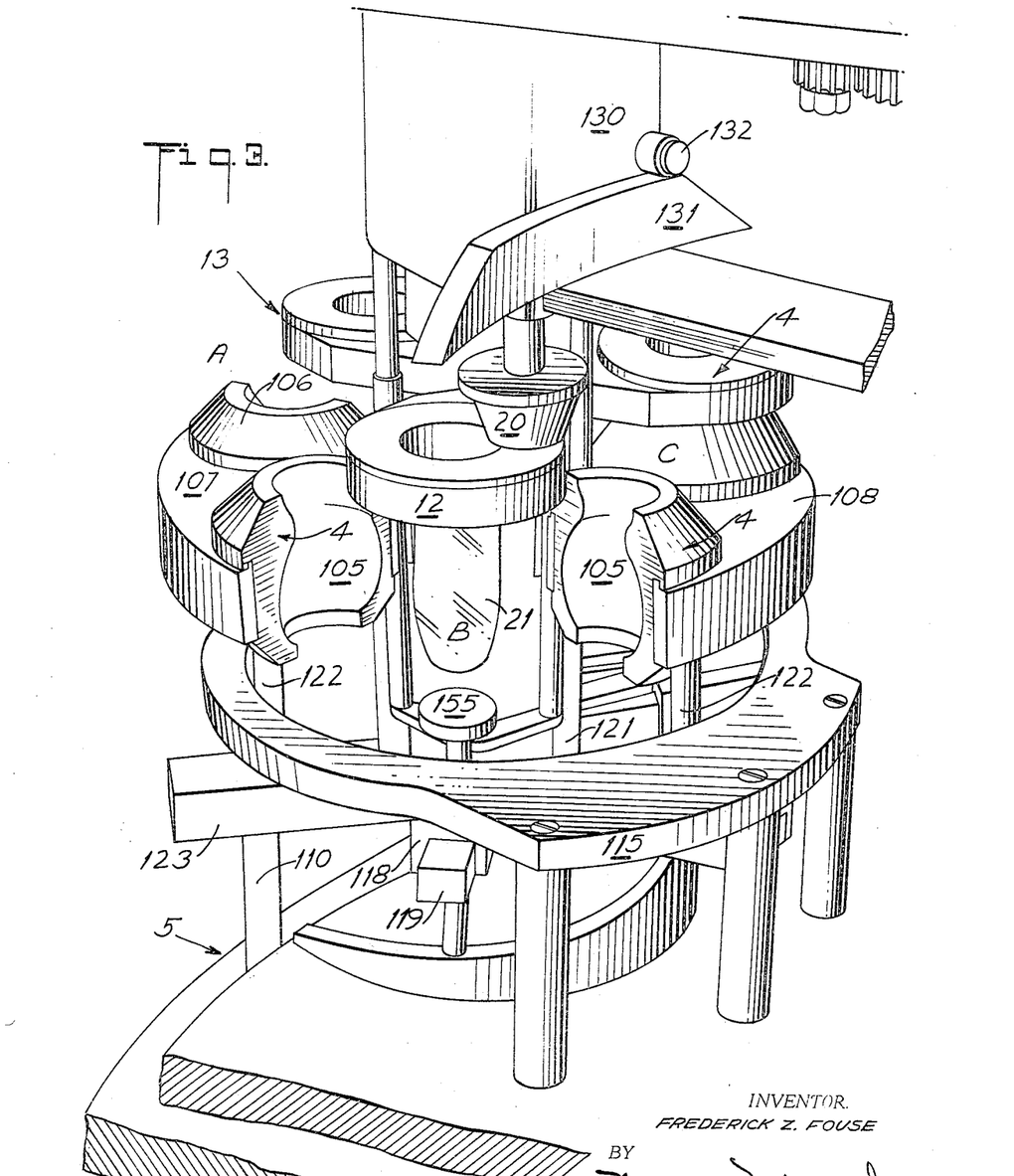
FIG. 3 is an enlarged detailed perspective view of a mold head on the paste mold turret.
Figure 4:
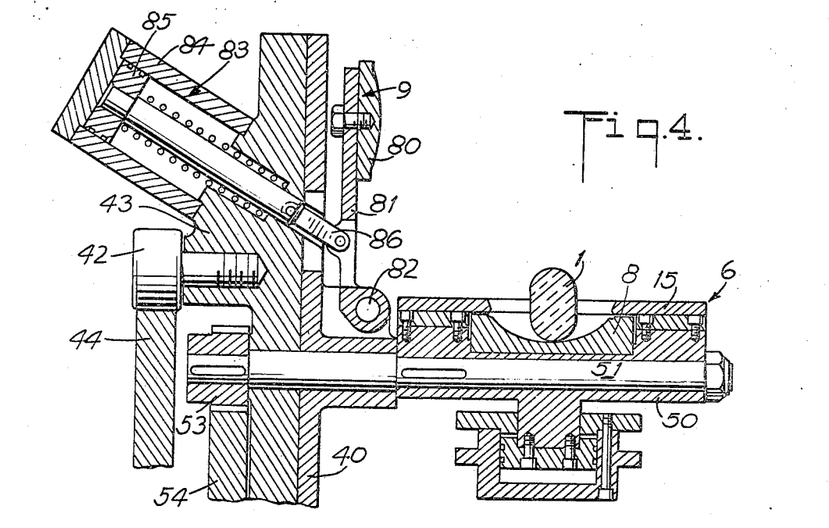
FIGS. 4–6 are enlarged detailed vertical sectional views of the patty forming head shown in three successive positions during the forming of a patty.
Figure 5:
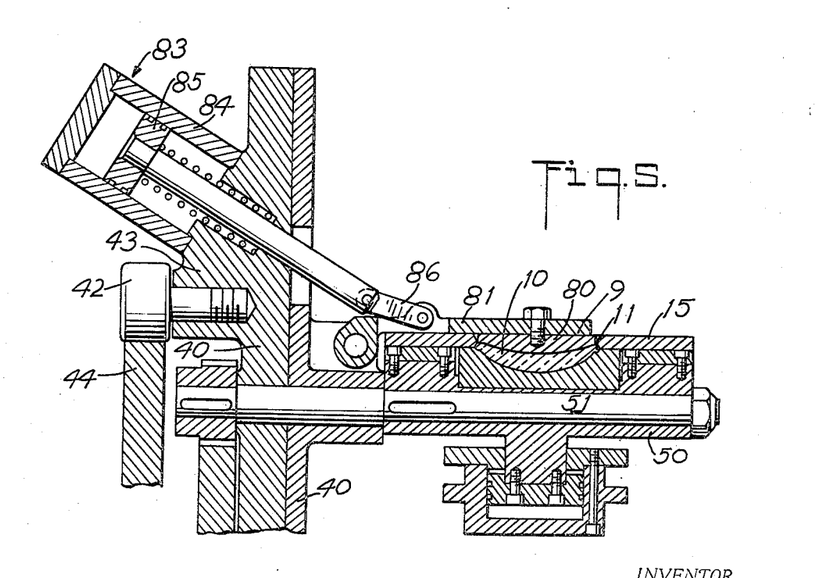
Figure 6:
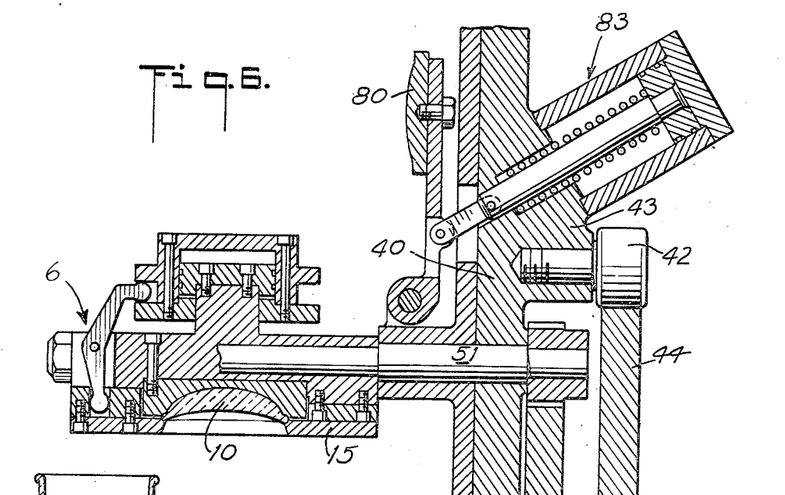

Each of the paste mold head assemblies 13, as seen in FIG. 1, includes a vertical paste mold support shaft 18. A plurality of individual paste molds 4 are rotatably mounted on shaft 18 for rotation about it as the entire paste mold turret 5 rotates around the main paste mold turret post 17. In order to provide a paste mold turret 5 of practical size and which will at the same time provide a sufficient blowing period for the glass articles, each molding cycle for an individual paste mold 4 takes three turns of the paste mold turret 5 around post 17. During this period, each individual mold 4 is stepped around its own support shaft 18 to the three positions A, B, and C illustrated in FIGS. 1 and 3. The patty 10 in a neck ring 12 is subjected to the forming operations which in a preferred embodiment illustrated comprise a separate puffing or first blowing operations and a subsequent blowing or final forming step. Thus while a mold 4 is open at the first position A, its neck ring 12 receives the patty 10 as described above. Thereafter and during further rotation of the main paste mold turret 5, this mold is rotated in a counter-clockwise direction to move the loaded neck ring 12 and its mold 4 into a first blow or puffing position B where a blow head 20 (FIG. 3) is moved downwardly against the patty supporting neck ring 12 and relatively high pressure puffing or blowing air is forced against the patty in an initial forming operation to partially expand or shape the hot patty into a preliminary hollow form 21.

The blow head 20 is now lifted from the neck ring 12 and the mold 4 is rotated again in a counter-clockwise direction to a second forming position C where air of lower pressure is applied for a further shaping of the glass article by blow head 22 (FIG. 2) while the above described relatively rotation between the article and the paste mold 4 is provided by the rotation of the article supporting neck ring 12. This blowing operation is terminated and the blow head 22 is raised and the mold 4 is turned and swung open at the transfer position A. The completed article is now transferred by a suitable transfer apparatus 23 to clear the mold 4 and to permit the mold to be lubricated by the water spray directed against the halves of the open mold 4 as the paste mold turret returns the mold 4 to the transfer position adjacent the patty former 3.

The above described forming method and the related machine elements will now be described in greater detail under appropriate headings.

THE PATTY FORMER

As already indicated, the patty former 3 receives a glass gob 1 in the usual form as cut and fed from the glass furnace by a regular gob feed chute 2.

The principal element of the patty former 3 is the patty forming head 6 in which patty shaping operation is performed. In the preferred embodiment illustrated, four individual patty forming heads 6 are mounted about the periphery of the rotating drum 7 which carries the forming heads 6 from their loading position to their patty transferring position in a synchronized movement provided by the drive means illustrated in FIGS. 1 and 2.

The patty former 3 has a fixedly mounted central support shaft 30 (FIG. 2) which is surrounded by the rotating drum 7 mounted thereon on suitable bearings 31. The lower portion of the drum 7 includes a cylindrical drive collar 32 which is driven from a main drive shaft 34 (FIG. 1) mounted in the base of the machine and which is in turn driven by a suitable drive motor 35.

The coupling between the drive motor 35 and the main horizontal drive shaft 34 preferably includes a clutch 36 whose output shaft 37 is coupled to the drive shaft 34 with a suitable worm gear coupling 38. The drum 7 of the patty former 3, the paste mold turret 5, and the transfer apparatus 23 are all driven from direct worm gear and worm couplings 39 with the main drive shaft 34 so that they rotate in synchronism. For this reason, the transfer period in which the gob 1 is fed into a head 6 on the patty former, the transfer period when the completed patty 10 is fed to a paste mold 4, and the final transfer period where the completed article is removed by the article transfer apparatus 23 all coincide in the time. While the patty former 3 and the paste mold turret 5 may be continuously rotated, the above described clutch 36 may be used to provide a brief dwell period to facilitate the transfer of the gob 1, the patty 10 or the completed article in certain forming operations.

The patty forming drum 7 has a general hollow cylindrical form for supporting the several patty forming heads 6. Vertical movement of each of the heads 6 is provided by flanged mounting carriages 40 which slidably support the heads 6 in elongated carriage guide slots 41 (FIG. 11) formed in the walls of the drum 7. Each slidable carriage 40 has a cam roller 42 rotatably mounted on its inner portion 43. Each of these rollers 42 rides on the surface of a cylindrical cam 44 fixedly mounted by a central collar 45 on the center post 30. The upper surface of the cylindrical cam is shaped generally as illustrated in FIG. 2 to provide an elevated portion 46 adjacent the gob transfer position to raise the patty forming heads 6 under the gob feed chute 2 to receive the molten glass gob 1 from the glass furnace. The surface of cam 44 then slopes downwardly so that the gob forming head 6 is lowered to its lowered and patty transfer position adjacent the paste mold machine turret 5, as illustrated by the patty 10 at the center of FIG. 2. The remaining portion of the cam surface then raises the patty forming head 6 as it is further carried by the rotating drum 7 back to the gob transfer position under chute 2.

Figures 9, 10, 11:
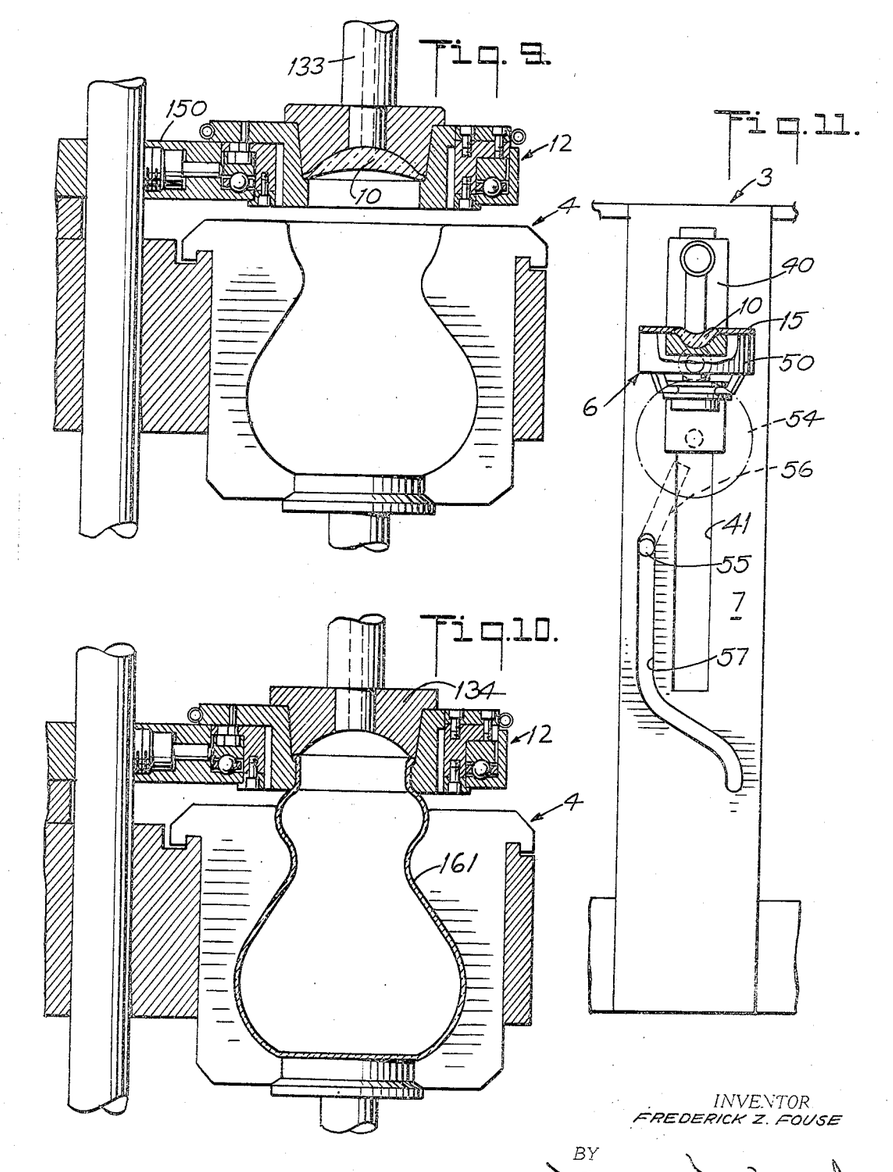
FIG. 9 is a vertical sectional view of a paste mold at the beginning of the blowing step.
FIG. 10 is a vertical sectional view of the paste mold corresponding to FIG. 9 showing the completely blown glass article after the blowing operation.
FIG. 11 is an enlarged fragmentary side elevational view of the patty forming turret.

Each patty forming head 6 includes a patty shaping die 8, a cooperating neck ring 15 for forming the flanged or neck ring portion 11 (FIG. 7) of the patty 10 and a patty flattener 9 which closes over the above two elements for confining and shaping the glass gob 1. In order to permit the dumping or dropping of the completed patty 10 from the die 8 after the patty 10 is formed, the patty forming die 8 is pivotally mounted in a bracket 50 by a generally horizontal shaft 51 rotatably mounted in the patty forming carriage 40. This shaft 51 rotates to turn the bracket 50 and the die 8 from their gob receiving position illustrated at the center of FIG. 1. A small pinion 53 is attached to the inner end of the shaft 51 in position to engage a crank gear 54 also rotatably attached to the patty forming carriage 40. A cam roller 55 (FIG. 11) at the outer end of a crank arm 56 operates in a cam slot 57 formed in the drum wall 7 adjacent to the carriage slot 41. This cam is shaped as illustrated in FIG. 11 so that the crank gear 54 is rotated about a half turn as the patty former carriage 40 reaches the lower portion of the carriage guide slot 41 under the control of the patty forming head cam 44. This inverts the die bracket 50 and the die 8 for the patty transfer.

Figure 15:
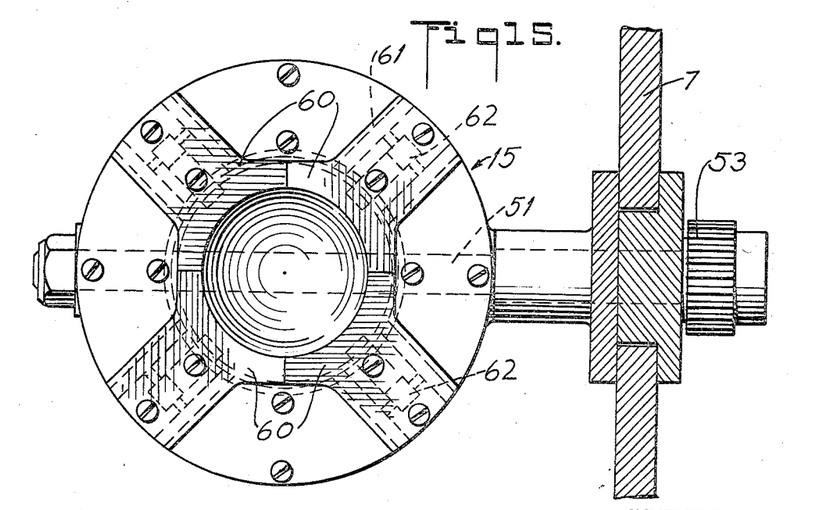
FIG. 15 is a horizontal sectional view of a patty forming head taken along line 15—15 on FIG. 7.

As already indicated, the flange or neck ring support portion 11 of the patty 10 is formed by a neck ring 15 mounted on the patty former bracket 50 immediately above the patty forming die 8. This neck ring 15 is formed of four similar segments 60 (FIG. 15) all being slidably mounted on the bracket 50 in radial slots 61 for permitting the neck ring to be opened after the patty formation and to facilitate the above described transfer of the patty 10 to the paste mold. Each of the slidably mounted segments 60 of the neck ring 15 is moved in and out under the control of a crank 62 pivotally attached to the segment 60 at one end 63 (FIG. 7) and with its opposite end 64 coupled to an air motor 65. As illustrated in FIG. 7, the air motor 65 has a fixed piston 66 provided as a portion of the bracket 50 and which slidably supports the cylinder 67 of the air motor. Movement of the cylinder 67 of the air motor cylinder 67 towards the bracket 50 is seen to turn the cranks 62 to slide the attached segments 60 of the neck ring 15 outwardly thereby releasing the patty 10 for the transfer. Subsequent movement of the motor cylinder 67 away from the bracket 50 returns the segments 60 of the neck ring 15 inwardly to their patty forming position.

The upper portion of the patty forming drum 7 includes an air inlet manifold 70 and an exhaust manifold 71. Arcuate air inlet slots 72 are provided in the air inlet manifold properly positioned and proportioned to couple opposite ends of the air cylinder 67 to air under pressure through lines 73 at the appropriate time and for the proper intervals to open and close the neck ring 15. Similar exhaust slots 74 are provided to exhaust the cylinder ends.

The actual shaping of the molten glass gob 1 in the die 8 is done as the patty forming head 6 is carried by the rotating drum 7 from the gob feeding position to the patty transfer position by the lowering of the patty flattener 9 against the gob 1. The patty flattener 9 includes a shaping head 80 mounted on a patty flattener arm 81 pivotally connected to the carriage 40 at 82. The arm 81 and its attached head 80 are moved to and from the patty shaping position by an air motor 83 whose cylinder 84 is fixedly attached to the carriage 40 and whose piston 85 is pivotally connected to the arm as shown at 86. The air motor 83 is operataed by air from the above described air and exhaust manifolds 70 and 71 in a properly timed sequence by slots 87 and 88 which move the head 80 into shaping position as the patty forming head 6 moves toward the transferred point and which thereafter lifts the head 80 clear of the patty 10 for the transfer and the subsequent return of the patty shaping head 6 to the gob loading position.

Gob cutting shears at the furnace operate in the usual fashion and their drive is synchronized with the above described paste mold machine drive system to furnish the gobs 1 at the proper interval in the above described patty forming operation.

THE PASTE MOLD TURRET

After the patties 10 are formed on the patty former 3, the patties 10 are transferred, as described above to the paste mold turret 5 where the article forming operation is performed.

As seen in FIGS. 1 and 2, the paste mold turret 5 is rotatably mounted on the vertical shaft 17 mounted on base 100. The rotating turret includes a circular bottom plate 101 mounted on hub 102 and a top plate 102' rotatably mounted on the shaft 17 on bearing 103.

The series of paste molding heads 13, which includes eight in the preferred embodiment, are mounted around the edge of the turret 5 on support shafts 18.

Each of the molding heads 13 includes three paste molds 4 which are mounted on the support shafts 18 for rotary movement around the shafts 18.

One complete forming operation is done in each mold 4 for three revolutions of the large turret 5 around shaft 17.

As seen in FIG. 1, the three molds 4 occupy three positions around their mounting shafts 18. Thus, the outer mold 4 at position A has its halves 105 open on mold support sections 106 and 107.

A patty 10 is dropped into the neck ring 12 for this mold 4 from the patty former 3. As the turret 5 now continues to rotate in a clockwise direction (FIG. 1), this mold 4 is carried to a mold head turning station D. As will be more fully described below, at the mold head turning station D.

A cam roller 109 on mounting post 110, engages a slot 111 in the molding head 13 and rotates all three molds 4 around the support shaft 18 in a counter-clockwise direction thereby advancing the neck ring 12 which has just received a patty 10 and its related mold 4 to the puffing station B. At the same time, the mold 4 previously at the puffing station B will be turned to the final blow station C and the mold 4 where the article has been completed will be opened and advanced to station A to permit the completed article to be removed when that mold passes the take-out apparatus 23.

The mold heads 13 each of which includes three molds 4 will now be described.

Figure 13:
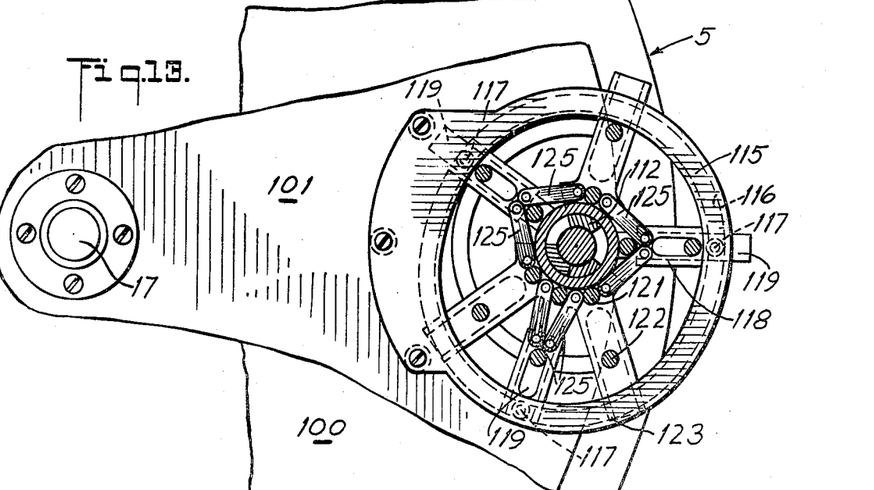
FIG. 13 is a top plan view partially in section of a portion of the paste mold turret showing the mold positioning closing members.

Each of the molds 4 is a split mold having halves 105. As best seen in FIG. 1, two mold halves from different molds 4 are mounted on the three mold support sections 106, 107, and 108. The mold support sections 106, 107, and 108 are pivotally mounted on the support shaft 18 on arcuate bearing members 112 within hollow cylindrical collars 113 and 114 (FIGS. 2 and 13). The mold support sections open and close the three molds at the Stations A, B, and C under the control of a cam system automatically operated by the rotation of the turret 5 as will now be described.

A cam plate 115 is mounted on the lower turret plate having a cam slot 116 in its lower surface. The cam slot contains three space cam follower rollers 117 which position the mold support sections through the intermediation of a link-type coupling which will be described with particular reference to FIGS. 3 and 13. Each of the cam rollers 117 is mounted on a slide member 118 slidably mounted on a radially directed guide arm 119. Three guide arms are provided positioned at 120° from one another and radiating from a center hub 120 rotatably mounted on the support shaft 18.

Each of the mold support sections 106, 107, and 108 are attached by a pair of vertical coupling rods 121 and 122 to a radial guide arm 123 which has its inner end slidably engaged between a collar 124 and support shaft 18. The opening and closing of the molds 4 by movement of their support sections 106, 107, and 108 is controlled by link members 125 which connect each guide arm 123 to the two adjacent cam roller slide members 118.

The above mentioned cam slots 111 which engage the cam roller 109 to turn the molds 4 as the turret 5 advances are formed in the bottom of the guide arms 123. Each time that the paste mold turret 5 moves a head 13 past the cam roller 109, the head 13 is turned on its support shaft 18 by a slot 111 causing the above described mold movement as the three cam rollers 117 in each head 13 move along the cam slot 116.

A blow head 22 is provided for each paste mold head 13. Each blow head comprises a block 130 mounted for vertical movement on the top of the support shaft 18. The block 130 rests in operative position above the molds 4 except during the above described mold advancing action when the block 130 is lifted upwardly by the stationary lift cam 131 which engages cam roller 132 on the block 130.

Figure 12:
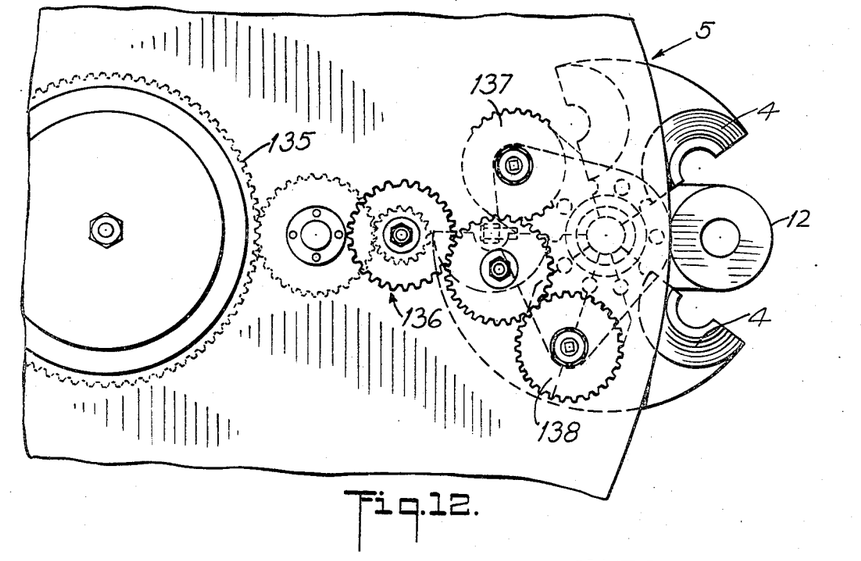
FIG. 12 is a top plan view of a portion of the paste mold turret illustrating the neck ring drive system.

The block 130 rotatably mounts a pair of blow head plugs 133 (FIGS. 2 and 9) and 134 (FIG. 10) which are positioned to engage the neck rings 12 at the puff position B and the blowing position C respectively. The plugs 133 and 134 are rotated to turn the neck rings during blowing by a gear train which includes a stationary gear 135 on the turret post 17 and a connecting gear train 136 which drives gears 137 and 138 on the blow head plugs 133 and 134 (FIG. 12).

A manifold 140 on the turret post 17 includes one air chamber 141 providing a source of air at puffing pressure and which is coupled to the puffing head plug 133 by a suitable conduit 142 through a suitably proportioned slot in the manifold 140. Similarly, a chamber 143 is provided for furnishing air to the blowing head plug 134 through a manifold slot proportioned to provide air for the proper blowing period at station C.

The neck rings 12 are mounted on radial arms on support members 150 rotatably positioned on each support shaft 18. The members 150 are connected to the guide arms 119 for rotation therewith and to keep the neck rings 12 centered above the molds by coupling rods 151.

Figures 8, 16:
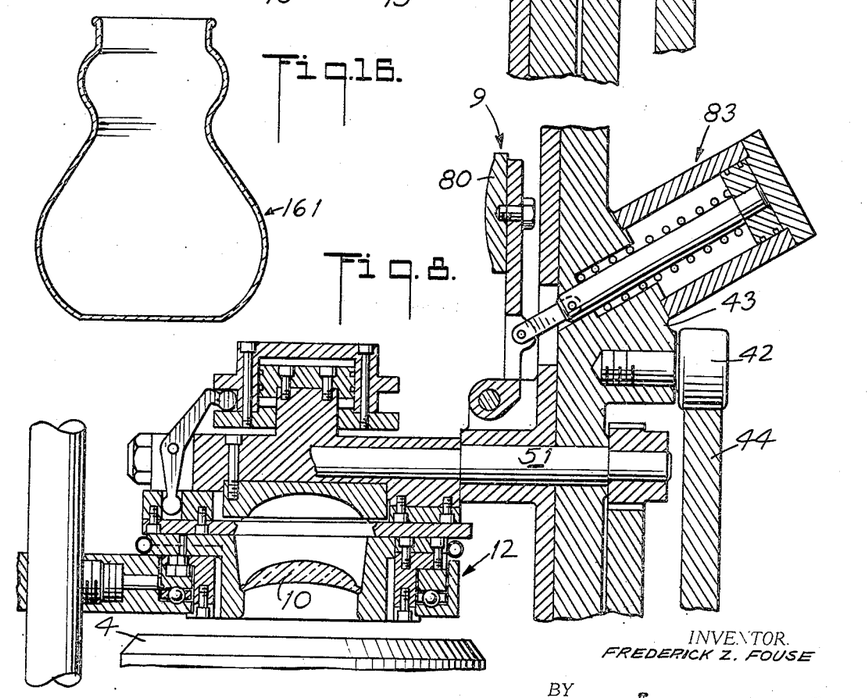
FIG. 8 is a vertical sectional view of the patty forming head at the transfer position and corresponding to FIG. 7 showing a patty transferred to the paste mold.
FIG. 16 is a vertical sectional view of a typical hollow glass bowl as formed on the apparatus of the invention.
Figure 14:
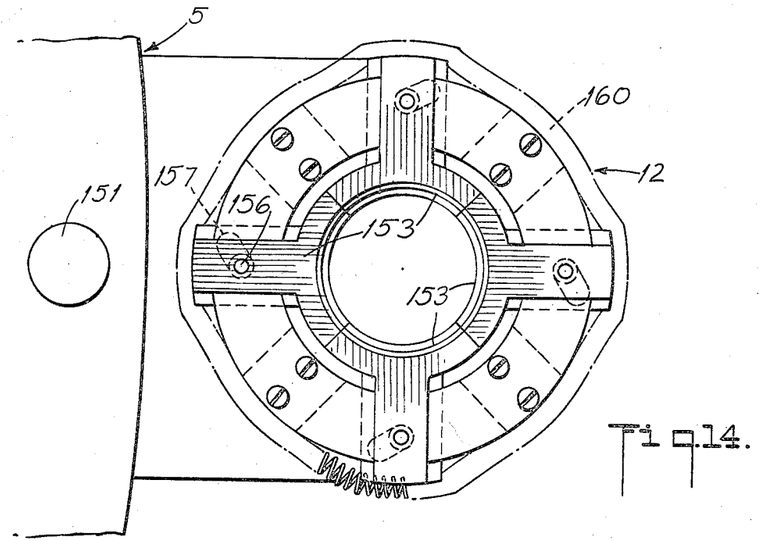
FIG. 14 is a horizontal sectional view of a paste mold neck ring taken along line 14—14 on FIG. 7.

As illustrated in FIGS. 7 and 14, the neck ring 12 is rotatably mounted in the support 150 on bearings 152. The neck rings 12 have four sections 153 slidably mounted on a support ring 154 for radial movement to release the completed article onto the cam operated support pedestals 155 for removal at the transfer apparatus 23. Each of the sections 153 is coupled by a pin 156 to a cam slot 157 in the support ring 154. The ring 154 is engaged by a small air piston 158 for rotation to rotate the ring 154 at the proper interval to open the neck ring. As seen in FIG. 2, an air manifold 159 provides a properly timed air supply through a line 160, block 130, and rod 151 (FIG. 7) to move the ring turning piston 158 against the force of an annular spring 160 to open the neck ring 12 to release a finished article such as bowl 161 (FIG. 16).

A manifold section 162 provides a supply of water through a conduit 163 to spray the open molds 4 after the completed article has been removed and prior to the feeding of the next patty 10 to that mold.

It will be seen that the present invention provides a new and novel glass forming machine and method particularly adapted for the formation of thin walled glass articles including articles of relatively large size. The method and apparatus are particularly useful in forming seamless articles such as bowls, laboratory vessels, tumblers, and the like at high speed and by a paste mold process which results in seamless articles with side walls of uniform thickness. The method is adapted for performance on machinery, in accordance with the invention, which is compact in size and efficient in operation.

Having thus described my invention, I claim:

1. A glassware molding machine for forming hollow glass articles comprising the combination of a plurality of formers for forming glass patties from glass gobs, a rotatably mounted support mounting said formers at its periphery for moving said patty formers around a first circular path from a glass gob receiving station to a glass gob transfer station, a rotatably mounted molding turret positioned adjacent said patty former support, a plurality of molding heads for forming the patties into the hollow articles mounted at the periphery of said molding turret, each of said molding heads comprising a plurality of split molds pivotally mounted on a vertical support shaft means for swinging each mold between an open and a closed position, a neck ring for each of said split molds, means for transferring patties from the patty formers to said neck rings, drive means for turning said molding turret to successively present said molding heads to said patty transferring means, means for moving said molds around said posts to a plurality of molding positions and for rotating said neck rings with respect to said molds, and means for directing gas under pressure into said molds at a plurality of said molding positions at each post for blowing the hollow glass articles.

2. The machine as claimed in claim 1 in which each of said patty formers comprise a patty shaping die, a neck ring, and a patty flattener.

3. The machine as claimed in claim 1 in which said patty transfer means comprises a shaft rotatably supporting said patty formers on said support for rotation about a generally horizontal axis.

4. The machine as claimed in claim 1 in which said gas directing means comprises a plurality of outlets coupled to gas sources of differing pressure.

5. The machine as claimed in claim 2 in which said neck ring comprises a plurality of segments, and means for moving said segments radially of the neck ring for releasing the patties.

References Cited

UNITED STATES PATENTS

| | | | |
|---|---|---|---|
| 1,235,008 | 7/1917 | Canfield | 65—79 |
| 1,785,535 | 12/1930 | Sloan | 65—79 |
| 1,888,318 | 11/1932 | Hofmann | 65—241 |
| 1,945,982 | 2/1934 | Rowe | 65—80 XR |
| 2,669,806 | 2/1954 | Von De Walle et al. | 65—224 |
| 2,405,557 | 8/1946 | Bonnefoy-Cudroz | 65—224 |
| 2,729,916 | 1/1956 | Casler et al. | 65—264 |
| 2,036,333 | 4/1936 | Howard | 65—264 |

FOREIGN PATENTS 1,158,292  6/1958  France.

FRANK W. MIGA, Primary Examiner

U.S. Cl. X.R.

65—78, 79, 80, 229, 237, 239, 241, 264, 302, 361